US012617659B2

(12) United States Patent
Green et al.

(10) Patent No.: US 12,617,659 B2
(45) Date of Patent: May 5, 2026

(54) LOCKING TURNPLATE

(71) Applicant: Quality Stainless Products, Maryland Heights, MO (US)

(72) Inventors: Christopher Seay Green, St. Louis, MO (US); Michael Charles Burke, Chesterfield, MO (US)

(73) Assignee: Quality Stainless Products, Maryland Heights, MO (US)

( * ) Notice: Subject to any disclaimer, the term of this patent is extended or adjusted under 35 U.S.C. 154(b) by 401 days.

(21) Appl. No.: 18/315,475

(22) Filed: May 10, 2023

(65) Prior Publication Data

US 2024/0375922 A1     Nov. 14, 2024

(51) Int. Cl.
B66F 7/28         (2006.01)
B60B 29/00        (2006.01)
G01B 5/255        (2006.01)

(52) U.S. Cl.
CPC .............. B66F 7/28 (2013.01); B60B 29/001 (2013.01); G01B 5/255 (2013.01); B60B 2340/52 (2013.01)

(58) Field of Classification Search
CPC ..... B66F 7/28; B60B 29/001; B60B 2340/52; G01B 5/255
USPC ....................................................... 33/203.12
See application file for complete search history.

(56) References Cited

U.S. PATENT DOCUMENTS

| | | | | |
|---|---|---|---|---|
| 2,125,534 A | | 8/1938 | Wochner | |
| 2,208,063 A | * | 7/1940 | Wochner | B62D 15/00 33/203 |
| 3,143,810 A | * | 8/1964 | Mcclendon | G01B 5/08 33/203.12 |
| 3,181,248 A | * | 5/1965 | Manlove | G01B 5/255 33/203.18 |
| 3,231,983 A | * | 2/1966 | Baxter | G01B 3/02 33/203.12 |
| 4,280,280 A | * | 7/1981 | Eck | G01B 5/255 104/44 |
| 4,897,926 A | * | 2/1990 | Altnether | G01B 5/255 33/203.14 |
| 7,308,971 B2 | * | 12/2007 | Liebetreu | B66F 7/065 187/203 |
| 2006/0143931 A1 | | 7/2006 | Jackson | |
| 2012/0057954 A1 | * | 3/2012 | Bardin | B60B 30/10 414/427 |
| 2024/0375922 A1 | * | 11/2024 | Green | G01B 5/255 |

* cited by examiner

*Primary Examiner* — Peter J Macchiarolo
*Assistant Examiner* — Anna Josephine Saunders
(74) *Attorney, Agent, or Firm* — Harness, Dickey & Pierce, P.L.C.

(57)         ABSTRACT

According to an aspect of the present disclosure, a locking turnplate includes a cylinder body having a cylinder chamber. A piston is received in the cylinder chamber and a mid-plate is disposed above the cylinder chamber of the cylinder body. A top plate is supported above the mid-plate by a bearing assembly including a plurality of spaced ball bearings. A bushing is fixedly attached to the top plate and extends through an aperture in the mid-plate. The bushing includes a flange that engages a bottom shoulder of an aperture of the cylinder body, wherein applying a pressure to the cylinder chamber presses the piston toward the mid plate and causes the cylinder body to pull downward on the bushing and the top plate in order to compress the ball bearings and prevent the top plate from moving relative to the mid plate.

12 Claims, 2 Drawing Sheets

LOCKING TURNPLATE

FIELD

The present disclosure relates to a locking turnplate used for vehicle wheel alignment on a vehicle lift.

BACKGROUND

A turnplate is commonly used on a vehicle lift to assist in wheel alignment. A standard turnplate uses two locking pins to lock the turnplate in place as a vehicle is rolled onto the lift and the wheels are centered over the turnplates. The two locking pins are then removed to allow the turnplate to pivot about a full range of motion. The turnplate can then be used to perform a wheel alignment procedure as is known in the art. When the wheel alignment procedure is complete, the vehicle removed from the vehicle lift.

This section provides background information related to the present disclosure which is not necessarily prior art.

SUMMARY

This section provides a general summary of the disclosure, and is not a comprehensive disclosure of its full scope or all of its features.

According to an aspect of the present disclosure, a locking turnplate includes a cylinder body having a cylinder chamber. A piston is received in the cylinder chamber and a mid-plate is disposed above the cylinder chamber of the cylinder body. A top plate is supported above the mid-plate by a bearing assembly including a plurality of spaced ball bearings. A bushing is fixedly attached to the top plate and extends through an aperture in the mid-plate. The bushing includes a flange that engages a bottom shoulder of an aperture of the cylinder body, wherein applying a pressure to the cylinder chamber presses the piston toward the mid plate and causes the cylinder body to pull downward on the bushing and the top plate in order to compress the ball bearings and prevent the top plate from moving relative to the mid plate.

According to a further aspect, the locking turnplate has a thickness of 1.5 inches.

According to a further aspect, a plurality of feet are mounted to a bottom of the mid-plate.

According to a further aspect, the bearing assembly includes a bearing retainer supporting the plurality of ball bearings at spaced locations in an annular configuration surrounding the aperture in the mid-plate.

According to a further aspect, a plurality of centering springs are connected between the mid-plate and the cylinder body for biasing the cylinder body to a centered position relative to the mid-plate.

According to a further aspect, the mid-plate includes a handle portion extending from an edge thereof.

According to yet another aspect of the present disclosure, a locking turnplate includes a cylinder body having a center aperture and an annular cylinder chamber surrounding the center aperture. An annular piston is received in the annular cylinder chamber and a mid-plate is disposed above the annular cylinder chamber of the cylinder body and having an aperture aligned with the center aperture. A top plate is supported above the mid-plate by a bearing assembly including a plurality of spaced ball bearings. A center bushing is fixedly attached to the top plate and extends through the aperture in the mid-plate. The center bushing includes a flange that engages a bottom shoulder of the center aperture of the cylinder body, wherein applying a pressure to the annular cylinder chamber presses the annular piston toward the mid plate and causes the cylinder body to pull downward on the center bushing and the top plate in order to compress the ball bearings and prevent the top plate from moving relative to the mid plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
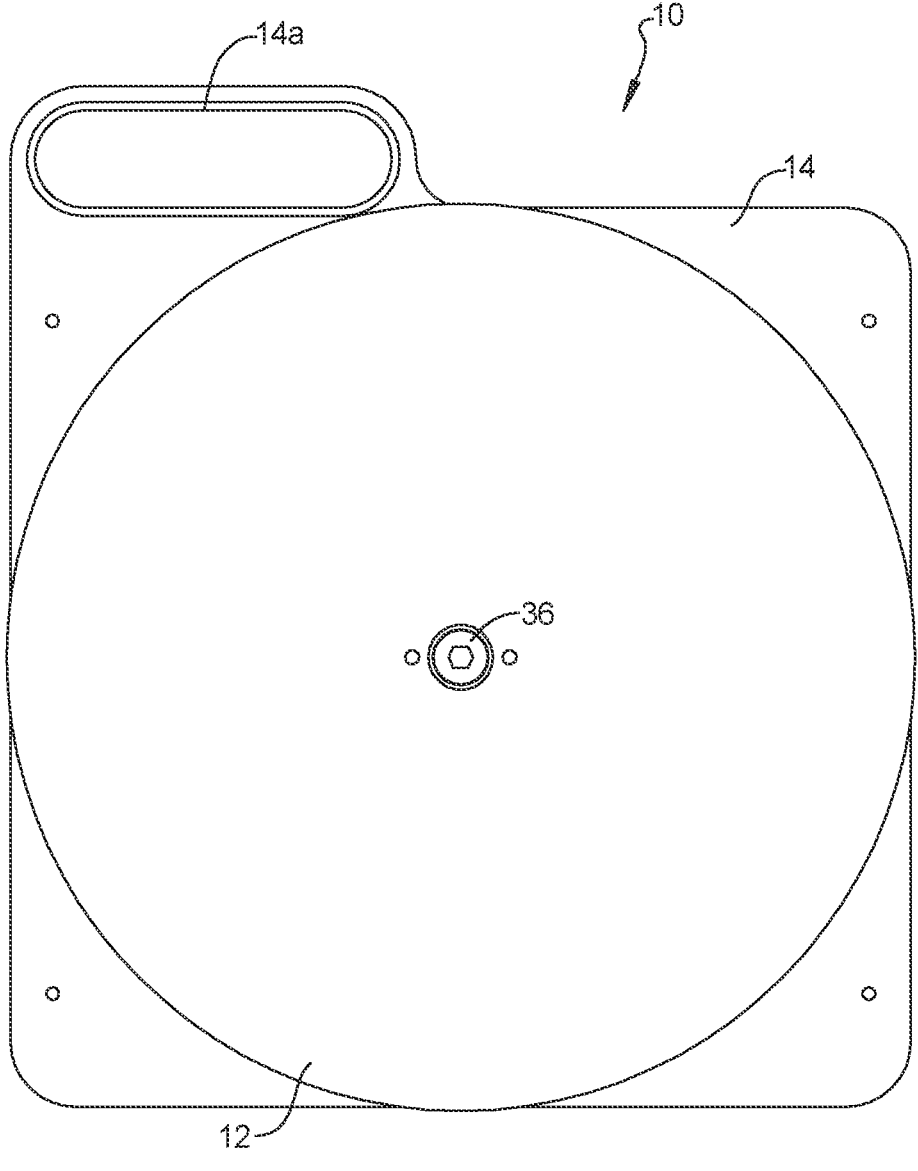
FIG. 1 is a top plan view of the locking turnplate according to the principles of the present disclosure.
Figures 2, 3:
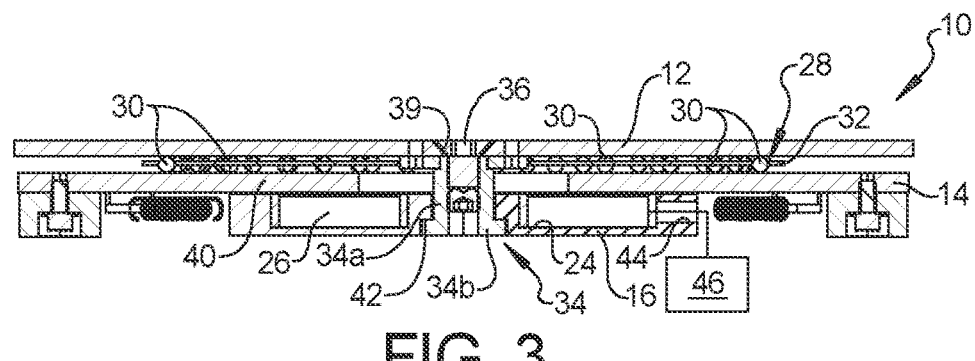
FIG. 2 is a bottom plan view of the locking turnplate.
FIG. 3 is a cross-sectional view of the locking turnplate taken along line 3-3 of FIG. 2.

With reference to FIGS. 1-3, the locking turnplate 10 according to the principles of the present disclosure will now be described. As shown in FIG. 1, the locking turnplate 10 includes a top plate 12 that is pivotally supported above a mid-plate 14. The mid-plate 14 can include a handle portion 14a extending from an edge thereof to allow the locking turnplate to be easily moved.

As shown in the bottom plan view of FIG. 2, the locking turnplate 10 includes a cylinder body 16 mounted below the mid-plate 14. A plurality of feet 18 or other support structure can be mounted to a bottom of the mid-plate 14 (six of which are shown). The support structure can alternatively include a single base. A plurality of spring brackets 20 are mounted to the bottom of the mid-plate 14 and a plurality of centering springs 22 are connected between a respective one of the spring brackets 20 and the cylinder body 16. It should be understood that the centering spring 22 can be connected to the mid-plate 14 by alternative fasteners and techniques. The centering springs 22 can be connected to equally spaced locations of the cylinder body 16.

With reference to FIG. 3, the cylinder body 16 has an annular cylinder chamber 24. An annular piston 26 is received in the annular cylinder chamber 24 below the mid-plate 14. The top plate 12 is supported above the mid-plate 14 by a bearing assembly 28 including a plurality of spaced ball bearings 30 supported within a cage 32 that maintains the spacing of the ball bearings 30. A bushing 34 is fixedly attached to the top plate 12 by a screw 36 that is received through an opening 38 in the top plate 12. The bushing 34 includes a cylindrical section 34a that extends through an aperture 40 in the mid-plate 14. The bushing 34 includes a flange 34b that engages a bottom shoulder 42 of an aperture of the cylinder body 16. The cylinder body has an air inlet port 44 adapted to connect the annular cylinder chamber 24 to one of a pressurized air or fluid source 46. The locking turnplate 10 can be made with a thickness of 1.5 inches to accommodate existing vehicle lifts, although other smaller or greater thicknesses could be used.

In operation, an air or fluid pressure is supplied to the annular cylinder chamber 24 by the pressurized air or fluid source 46 to press the annular piston 26 toward the mid plate 14 and cause the cylinder body 16 to pull downward on the bushing 34 and the top plate 12 in order to compress the ball bearings 30 and prevent the top plate 12 from moving relative to the mid plate 14. A vehicle can be rolled onto the locking turnplate 10 while it is locked and the turnplate 10 can then be unlocked by releasing the pressure from the cylinder chamber 24. A wheel caster sweep (steering alignment) procedure can then be performed on the vehicle while the turnplate is free to pivot, as is known in the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A locking turnplate, comprising:
   a cylinder body having an annular cylinder chamber surrounding a center hub portion that includes an aperture therein, the annular cylinder chamber being connected to a pressure source;
   an annular piston received in the annular cylinder chamber;
   a mid-plate disposed above the annular cylinder chamber of the cylinder body;
   a top plate supported above the mid-plate by a bearing assembly including a plurality of spaced ball bearings;
   a bushing fixedly attached to the top plate and extending through an aperture in the mid-plate, the bushing including a flange that engages a bottom shoulder of the aperture of the cylinder body, wherein applying a pressure from the pressure source to the annular cylinder chamber presses the annular piston toward the mid plate and causes the cylinder body to pull downward on the bushing and the top plate in order to compress the ball bearings and prevent the top plate from moving relative to the mid plate.

2. The locking turnplate according to claim 1, wherein the locking turnplate has a thickness of 1.5 inches.

3. The locking turnplate according to claim 1, further comprising a plurality of feet mounted to a bottom of the mid-plate.

4. The locking turnplate according to claim 1, wherein the bearing assembly includes a bearing retainer supporting the plurality of ball bearings at spaced locations in an annular configuration surrounding the aperture in the mid-plate.

5. The locking turnplate according to claim 1, further comprising a plurality of centering springs connected between the mid-plate and the cylinder body for biasing the cylinder body to a centered position relative to the mid-plate.

6. The locking turnplate according to claim 1, wherein the mid-plate includes a handle portion extending from an edge thereof.

7. A locking turnplate, comprising:

a cylinder body having a center aperture and an annular cylinder chamber surrounding the center aperture, the annular cylinder chamber being connected to a pressure source;

an annular piston received in the annular cylinder chamber;

a mid-plate disposed above the annular cylinder chamber of the cylinder body and having an aperture aligned with the center aperture;

a top plate supported above the mid-plate by a bearing assembly including a plurality of spaced ball bearings;

a center bushing fixedly attached to the top plate and extending through the aperture in the mid-plate, the center bushing including a flange that engages a bottom shoulder of the center aperture of the cylinder body, wherein applying a pressure from the pressure source to the annular cylinder chamber presses the annular piston toward the mid plate and causes the cylinder body to pull downward on the center bushing and the top plate in order to compress the ball bearings and prevent the top plate from moving relative to the mid plate.

8. The locking turnplate according to claim 7, wherein the locking turnplate has a thickness of 1.5 inches.

9. The locking turnplate according to claim 7, further comprising a plurality of feet mounted to a bottom of the mid-plate.

10. The locking turnplate according to claim 7, wherein the bearing assembly includes a bearing retainer supporting the plurality of ball bearings at spaced locations in an annular configuration surrounding the aperture in the mid-plate.

11. The locking turnplate according to claim 7, further comprising a plurality of centering springs connected between the mid-plate and the cylinder body for biasing the cylinder body to a centered position relative to the mid-plate.

12. The locking turnplate according to claim 7, wherein the mid-plate includes a handle portion extending from an edge thereof.

* * * * *